US012795450B2

(12) United States Patent
Kochiev

(10) Patent No.: US 12,795,450 B2
(45) Date of Patent: Nov. 10, 2026

(54) LOAD BALANCING OF RADIO ANTENNAS BASED ON AMBIENT TEMPERATURE

(71) Applicant: T-Mobile USA, Inc., Bellevue, WA (US)

(72) Inventor: Timur Kochiev, Irvine, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 13 days.

(21) Appl. No.: 19/003,418

(22) Filed: Dec. 27, 2024

(65) Prior Publication Data

US 2026/0189982 A1 Jul. 2, 2026

(51) Int. Cl.
*H04W 28/08* (2023.01)
*H04B 7/0452* (2017.01)
*H04W 24/02* (2009.01)

(52) U.S. Cl.
CPC ...... *H04W 28/0958* (2020.05); *H04B 7/0452* (2013.01); *H04W 24/02* (2013.01)

(58) Field of Classification Search
CPC . H04W 28/0958; H04W 24/02; H04B 7/0452
See application file for complete search history.

(56) References Cited

U.S. PATENT DOCUMENTS 6,115,367 A 9/2000 Archambaud et al.
8,422,884 B2 4/2013 Mao
8,811,922 B2 8/2014 Mujtaba et al.
8,965,450 B2 2/2015 Hofmann et al.
9,241,300 B2 1/2016 Jalloul et al.
9,621,245 B2 4/2017 Hu et al.
10,098,544 B2 10/2018 Marcus et al.
10,153,830 B2 12/2018 Kosseifi et al.
10,236,959 B2 3/2019 Bengtsson et al.
10,341,914 B2 7/2019 Luo et al.
(Continued)

FOREIGN PATENT DOCUMENTS

CN 109155920 B 11/2021
CN 115136526 B 5/2024
(Continued)

*Primary Examiner* — Freshteh N Aghdam
(74) *Attorney, Agent, or Firm* — Ashurst Perkins Coie US LLP

(57) ABSTRACT

The disclosed technology manages temperature-induced signal degradation in terrestrial wireless telecommunications networks. The technology involves monitoring the temperature of an active radio antenna at a base station. The technology determines a triggering temperature that causes signal degradation and determines an available passive radio antenna to offload the user data within the same base station. Upon detecting the triggering temperature, user data is offloaded to the passive radio antenna. Communication is restored to the active radio antenna once normal temperature conditions along with quality signal are restored. The technology can dynamically distribute the offloading of user data by using artificial intelligence (AI)/machine learning (ML) algorithms to offload user data to the available passive radio that can maintain signal quality for the users. The triggering temperature can be determined based on historical data of the environmental conditions and/or standard specifications of electronic components for the radio antennas.

17 Claims, 4 Drawing Sheets

300

(56) References Cited

U.S. PATENT DOCUMENTS

| | | | |
|---|---|---|---|
| 10,367,260 | B1 | 7/2019 | Trocke et al. |
| 10,531,316 | B1 | 1/2020 | Ichapurapu et al. |
| 10,623,086 | B2 | 4/2020 | Kosseifi et al. |
| 10,957,968 | B2 | 3/2021 | Islam et al. |
| 10,966,101 | B2 | 3/2021 | Honglei |
| 10,992,368 | B1 * | 4/2021 | Chisu ..................... H04B 7/088 |
| 11,134,496 | B2 | 9/2021 | Levesque et al. |
| 11,218,181 | B2 | 1/2022 | Yu et al. |
| 11,223,395 | B1 | 1/2022 | Marupaduga et al. |
| 11,363,466 | B2 | 6/2022 | Khalid et al. |
| 11,736,152 | B2 | 8/2023 | Huang et al. |
| 11,751,275 | B2 | 9/2023 | Gopal et al. |
| 11,758,602 | B2 | 9/2023 | Subramanian et al. |
| 12,004,134 | B2 | 6/2024 | Lan |
| 12,095,509 | B2 | 9/2024 | Rahman |
| 12,120,697 | B2 | 10/2024 | Zhang et al. |
| 2013/0303145 | A1 | 11/2013 | Harrang et al. |
| 2016/0056525 | A1 | 2/2016 | Hansryd et al. |
| 2016/0204839 | A1 | 7/2016 | Liu et al. |
| 2019/0020405 | A1 | 1/2019 | Smith et al. |
| 2020/0119459 | A1 | 4/2020 | Fried et al. |
| 2020/0192442 | A1 * | 6/2020 | Islam ................ H04W 52/0209 |
| 2021/0091448 | A1 * | 3/2021 | Kang ..................... H01Q 1/242 |
| 2022/0209832 | A1 * | 6/2022 | Raghavan .............. H04B 7/063 |
| 2022/0407574 | A1 * | 12/2022 | Goto .................... H04B 1/0466 |
| 2023/0055613 | A1 | 2/2023 | Kotamraju et al. |
| 2023/0138578 | A1 | 5/2023 | Azizi et al. |
| 2024/0014551 | A1 | 1/2024 | Riddle et al. |
| 2024/0049335 | A1 | 2/2024 | Gopal et al. |
| 2024/0098652 | A1 | 3/2024 | Chien et al. |
| 2024/0241205 | A1 | 7/2024 | Sylvester |
| 2024/0243787 | A1 | 7/2024 | Kotamraju et al. |
| 2024/0283469 | A1 * | 8/2024 | Iwanaga .............. H04B 1/0057 |
| 2024/0324002 | A1 | 9/2024 | Lang et al. |
| 2024/0333343 | A1 | 10/2024 | Liu et al. |
| 2024/0413909 | A1 | 12/2024 | Rahman |
| 2025/0357988 | A1 * | 11/2025 | Chenumolu ........... H04B 7/063 |

FOREIGN PATENT DOCUMENTS

| | | | |
|---|---|---|---|
| CN | 114793488 | B | 6/2024 |
| CN | 118786725 | A | 10/2024 |
| CN | 118872211 | A | 10/2024 |
| DE | 112008002097 | B4 | 1/2019 |
| DE | 102019100164 | A1 | 7/2019 |
| EP | 3238478 | A1 | 11/2017 |
| EP | 3267870 | A1 | 1/2018 |
| EP | 2898602 | B1 | 9/2019 |
| EP | 4090040 | B1 | 4/2024 |
| JP | 2018507604 | A | 3/2018 |
| JP | 2020532919 | A | 11/2020 |
| KR | 101385916 | B1 | 4/2014 |
| KR | 102715376 | B1 | 10/2024 |
| WO | 2013170226 | A1 | 11/2013 |
| WO | 2014154576 | A1 | 10/2014 |
| WO | 2016145314 | A1 | 9/2016 |
| WO | 2019014542 | A1 | 1/2019 |
| WO | 2020236637 | A1 | 11/2020 |
| WO | 2021130516 | A1 | 7/2021 |
| WO | 2021173223 | A1 | 9/2021 |
| WO | 2022135702 | A1 | 6/2022 |
| WO | 2022266599 | A1 | 12/2022 |

* cited by examiner

LOAD BALANCING OF RADIO ANTENNAS BASED ON AMBIENT TEMPERATURE

BACKGROUND

In radio, multiple-input and multiple-output (MIMO) enhances a radio link's capacity by using multiple transmission and receiving antennas to exploit multipath propagation. MIMO is crucial for wireless communication standards like 3G, 4G, and 5G. MIMO antenna radios simultaneously send and receive multiple data signals over the same channel by leveraging different signal paths.

Massive MIMO combines an antenna array with hardware, software, and signal processing algorithms to adjust radiation patterns for varying traffic and propagation conditions. It allows simultaneous transmission and reception with different patterns. Features of massive MIMO include beamforming, null forming, and MIMO, which significantly boost performance through higher degrees of freedom from numerous radio chains.

Beamforming directs radio power toward specific receivers, enhancing signal strength and user throughput during transmission. During reception, it collects signal power from specific transmitters. These beams are continuously adjusted for optimal performance in both uplink (UL) and downlink (DL). Each antenna typically connects to its own transceiver and power amplifier, generating significant heat that can degrade signal quality if not managed.

BRIEF DESCRIPTION OF THE DRAWINGS

Detailed descriptions of implementations of the present invention will be described and explained through the use of the accompanying drawings.

Figure 1:
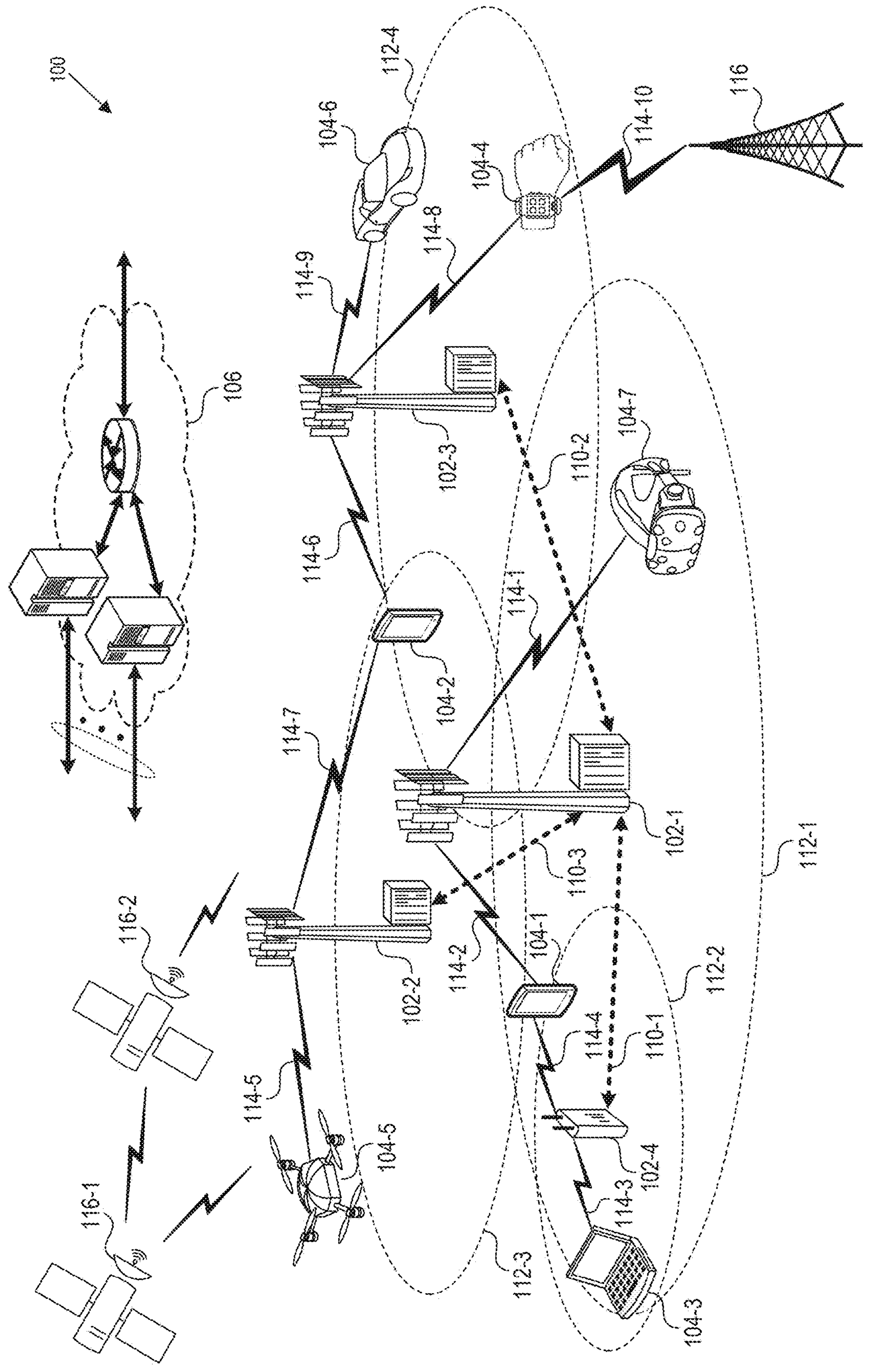
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to a system and method for managing the performance (e.g., receiving and transmitting premium user data with a quality signal) of radio antennas (e.g., active, passive) implemented in a terrestrial wireless telecommunications network (TWTN), particularly under varying ambient temperature conditions (e.g., overheating). In one example, the technology provides a solution for managing temperature-induced signal degradation in active radio antennas via artificial intelligence (AI)/machine learning (ML) algorithms. By dynamically offloading user data between active and passive antennas based on temperature data, the technology ensures continuous and reliable network performance under challenging environmental conditions. Certain passive antennas are less likely to be affected by temperature conditions because electronic components do not overheat from external temperatures such as weather. As such, the technology relates to offloading user data from active antennas.

The technology monitors a temperature that is degrading or can degrade performance of active radio antennas. The active radio antennas can be part of a time division duplex (TDD) massive MIMO system that communicates user data via a specific bandwidth (e.g., n41 5G new radio (NR) bands). The active antennas are equipped with transceivers and power amplifiers, enabling the active antennas to receive and transmit user data with quality signal strength under normal temperature conditions. The electronic components of the active antennas generate heat during operation because of the processing required for TDD operations and massive MIMO beamforming algorithms. The heat generation can lead to signal degradation, reduced Physical Resource Blocks (PRBs), lower signal-to-noise ratio (SNR), and potential malfunction of electronic components, particularly during high ambient temperatures due to the location of the antennas in an exposed environment.

To address these challenges, the technology determines when an active radio antenna reaches a triggering temperature threshold that causes degradation in signal strength. This threshold is determined based on temperature data specific to the antenna's location, which helps in accurately predicting the impact of temperature conditions on the electronic components. Upon determining that the temperature has surpassed the threshold, the technology identifies an available passive radio antenna, typically part of a frequency division duplex (FDD) system (e.g., n25 and n66 5G NR bands). The passive radio antennas do not have electronic components exposed to outside temperature conditions to the same degree as active antennas and thus are less susceptible to performance degradation cause by heat. Specifically, the structural placement of the electronic components for passive radio antennas on a base station makes the electronic components more resilient to temperature-induced signal degradation compared to active antennas.

Once an appropriate passive radio antenna is identified, the technology reconfigures the network to offload user data from the temperature-affected active radio antenna to the passive radio antenna. This reconfiguration is in accordance with the passive radio antenna's temperature conditions being within acceptable limits (e.g., conditions provide a continuous strong signal). The offloading process can be configured using AI/ML algorithms, which leverage historical temperature data to ensure efficient distribution of user data and maintain robust network connectivity. These algorithms help in reducing the computational complexity of the load balancing method implemented at the base station.

The disclosed technology also ensures that time-sensitive applications (e.g., teledriving) maintain a quality performance by prioritizing offloading application data to the passive radio antenna during overheating temperature conditions. Users of these applications are often subscribed to a separate network slice. The technology provides a load balancing method to ensure that the application latency requirements are met even under adverse temperature conditions (e.g., overheating). Typically, the premium slice user count is small and is not expected to overload the FDD carrier, thereby satisfying the premium user Service Level Agreement (SLA).

Furthermore, the disclosed technology is designed to reconfigure the user data to operate from the original active radio antenna once the temperature conditions return to normal and the electronic components are no longer affected. This ensures that the network operates efficiently and that the active radio antennas can resume their high-performance data receiving and transmitting roles when the active radio antennas are no longer affected by overheating.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 10"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ MIMO techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

Mitigating Effects of Temperature-Induced Degradation of Radio Antenna

Figure 2:
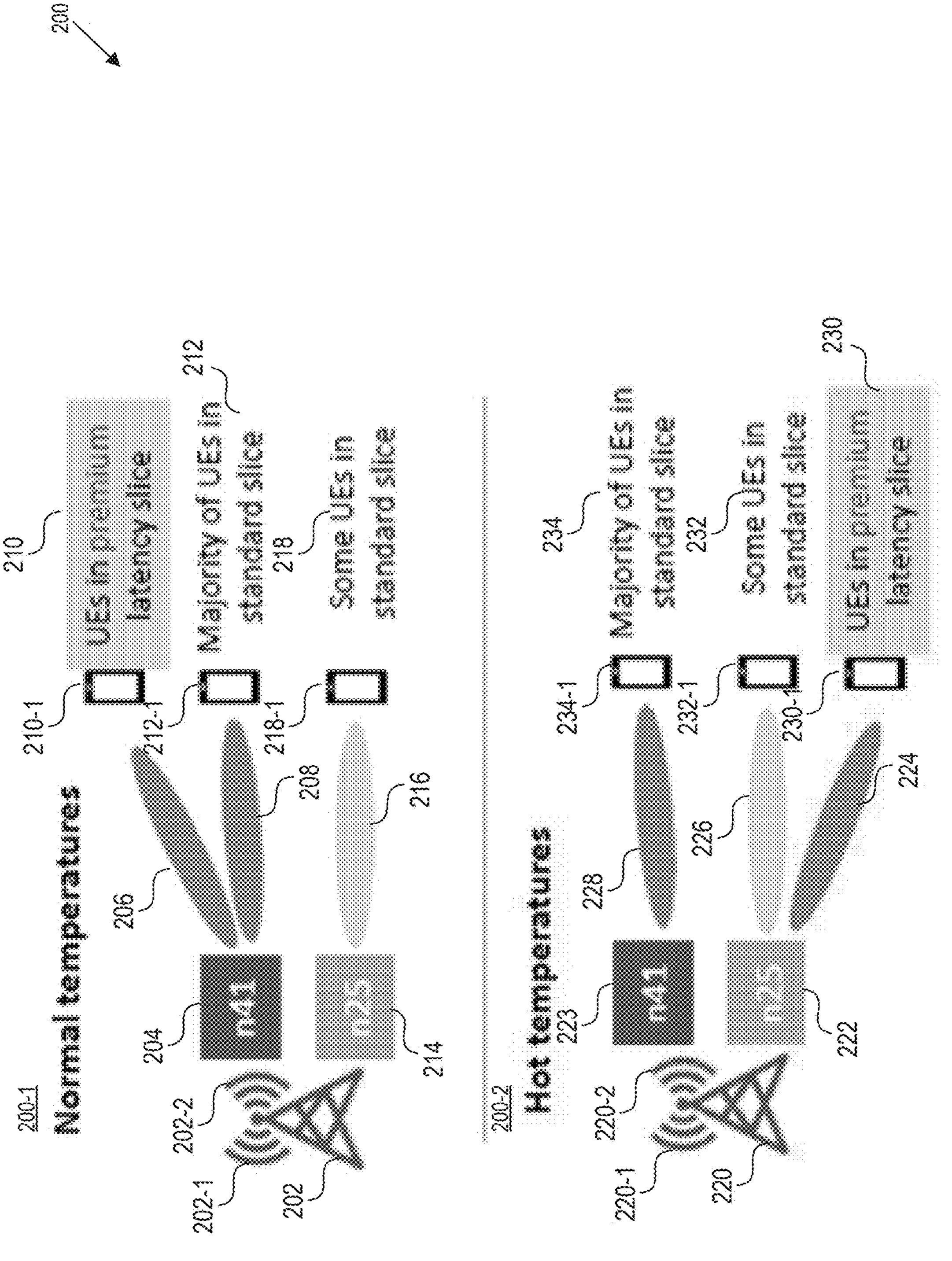
FIG. 2 is a block diagram that illustrates a system that can monitor a temperature associated with a first radio antenna and offload user data to a second radio antenna to mitigate signal quality degradation for a terrestrial wireless telecommunications network.

FIG. 2 is a block diagram that illustrates a system 200 that can implement some aspects of the disclosed technology to monitor a temperature associated with a radio antenna (e.g., active radio antenna, passive radio antenna) to mitigate signal quality degradation for a TWTN. A radio antenna is configured to communicate user data with a signal quality that works (e.g., transmit, receive) at a normal temperature (e.g., not overheating).

In the illustrated embodiment, the system 200 includes an active radio antenna 202-1 (e.g., TDD) and a passive radio antenna 202-2 (e.g., FDD), both located on the same base station 202. The base station 202 is working under normal temperatures 200-1. At normal temperatures 200-1, the electronic components (not shown) for the active radio antenna 202-1 are unaffected from temperature conditions (e.g., overheating), which allows the signal quality to operate (e.g., transmit user data) without any performance issues (e.g., signal degradation). The base station 202 utilizes 5G new radio bands (e.g., n41, n25) to communicate user data. More specifically, the active radio antenna 202-1 from the base station 202 operates in the n41 bandwidth 204 to communicate user data via a latency slice 206 (e.g., data for premium users) and/or standard slice 208 (e.g., data for the majority of users). The user 210 receives data at the user device 210-1 (e.g., mobile device, laptop, wearables) from the latency slice 206, which is transmitted wirelessly via the n41 bandwidth 204. The user 212 receives data at the user device 212-1 from the standard slice 208, which is transmitted wirelessly via the n41 bandwidth 204. Furthermore, the passive radio antenna 202-2 at the base station 202 operates in the n25 bandwidth 214 to transmit user data via a standard slice 216 (e.g., certain users). The user 218 receives data at the user device 218-1 from the standard slice 216, which is transmitted wirelessly via the n25 bandwidth 214.

In the illustrated embodiment, at hot temperatures 200-2, the system 200 depicts the temperature-affected active radio antenna 220-1 from base station 220 utilizing the 5G new radio bands (e.g., n41, n25) to offload user data to dynamically distribute and balance the load between the active radio antenna 220-1 and the passive radio antenna 220-2. The electronic components (not shown) for the active radio antenna 220-1 generate heat at normal temperatures 200-1 due to multiple antennas working simultaneously to communicate user data. Each active radio antenna 220-1 is paired with a transceiver and power amplifier and is configured for massive maximum input and maximum output operations. At hot temperatures 200-2, the electronic components for the active radio antenna 220-1 can overheat, resulting in signal quality degradation that affects the TWTN users (e.g., user 230, user 232, user 234). To compensate for the signal quality degradation for the active radio antenna 220-1 at hot temperatures 200-2, the system 200 can offload the user data being transmitted from the affected active radio antenna 220-1 to the unaffected passive radio antenna 220-2 by switching the bandwidths that the slices (e.g., stream of data) get transmitted from. For example, during hot temperatures 200-2, the n25 bandwidth 222 can transmit both the latency slice 224 to user device 230-1 for user 230 and the standard slice 226 to user device 232-1 for user 232 because the electronic components (not shown) for the passive radio antenna 220-2 do not generate as much heat as the electronic components for the active radio antenna 220-1. The electronic components of the passive radio antenna 220-2 do not overheat during the hot temperatures 200-2, resulting in normal signal quality (e.g., signal quality does not degrade). Meanwhile, the affected active radio antenna 220-1 uses the n41 bandwidth 223 to only transmit the standard slice 228 to user device 234-1 for user 234.

In some embodiments, offloading user data between bands is facilitated by an AI/ML algorithm. The AI/ML algorithm will move premium users between the bands being used by the active radio antennas and passive radio antennas based on historical temperature data. For example, an ML model can use historical network traffic, environment, and temperature data to project when the temperature of an antenna will reach a temperature that could impact user experience due to degradation in signal quality. This approach minimizes computational complexity and costs while maintaining SLAs for premium users.

The description of the disclosed technology described here in FIG. 2 and the associated drawings are illustrative examples and are not to be construed as limiting. One skilled in the relevant technology will understand, however, that the invention can be practiced without many details (e.g., various common components) or different embodiments that have been omitted for brevity. For example, the technology should not be limited to active and passive radio antennas. The technology can be applied to all antennas that are affected by an ambient temperature. In practice, temperature impacts antennas differently, therefore the technology can offload the user data from a first antenna that is being most impacted by temperature to a second antenna that is less affected or unaffected by the temperature to mitigate signal quality degradation for a TWTN.

Process for Managing Temperature-Induced Signal Degradation

Figure 3:
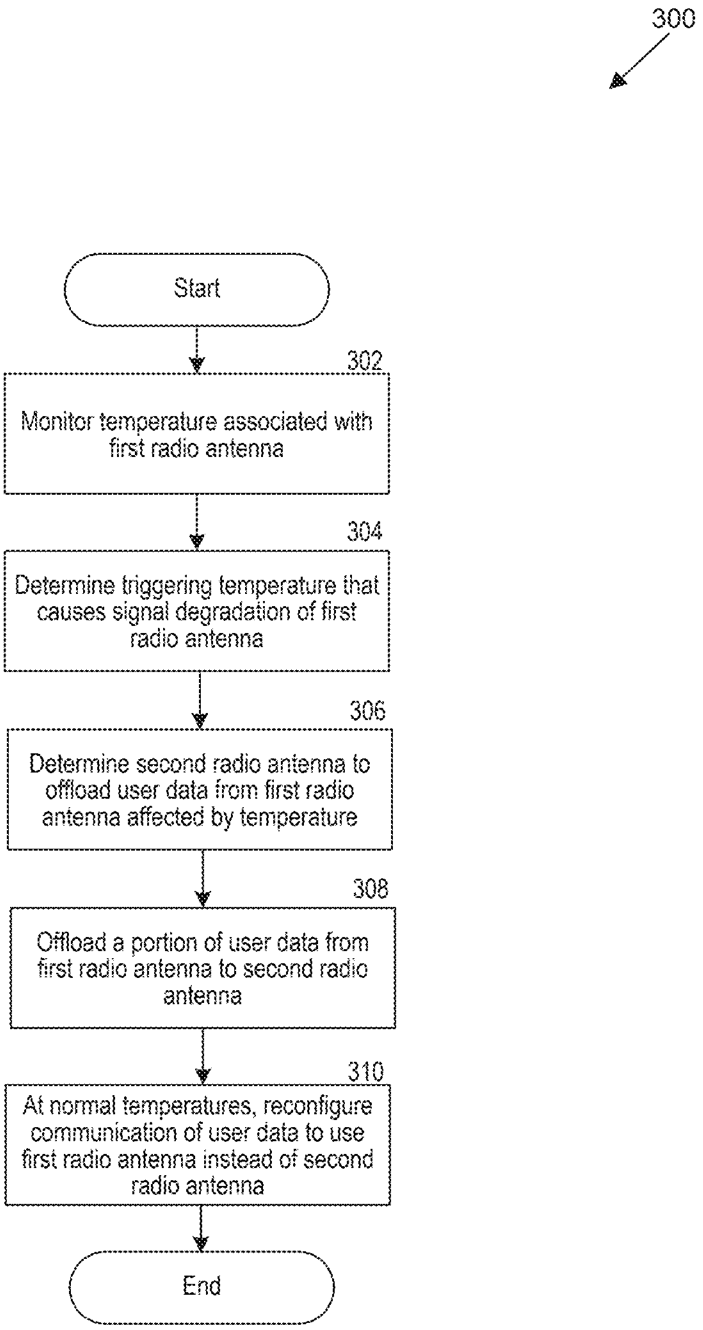
FIG. 3 is a flowchart of a process for load balancing antennas based on ambient temperature.

FIG. 3 is a flowchart of a process 300 performed by a telecommunications network for managing temperature-induced signal degradation of a TWTN comprising one or more radio antennas.

At 302, the system monitors a temperature associated with a first radio antenna of a TWTN. The first radio antenna is configured to communicate user data with a signal quality at a normal temperature. For example, at normal temperatures the first radio antenna is configured to communicate user data via n41 5G NR bands. However, the first radio antenna can be affected by temperature conditions causing signal degradation. For example, the local temperature can overheat electronic components of the first radio antenna.

At 304, the system determines a triggering temperature that causes signal degradation of the first radio antenna. The triggering temperature is equal to or greater than a threshold temperature based on a standard that affects the signal quality of the first radio antenna. In one embodiment, the system determines the triggering temperature that causes signal degradation of a first radio antenna by collecting data based on a standard historical index. An example of the index includes daily temperature measurements of a specific location for the past decade to cross-reference with overheating of electronic components. In another embodiment, the system determines the triggering temperature that causes signal degradation of a first radio antenna by collecting data based on a standard specification of the first radio antenna. An example includes data collected from thermal testing for quality control of electronic components.

At 306, the system determines a second radio antenna to offload user data from the first radio antenna affected by temperature conditions. The second radio antenna is located at the same base station where the first radio antenna is located. The second radio antenna is available and less affected or unaffected by the temperature conditions causing the signal degradation of the first radio antenna. In some embodiments, the first radio antenna is configured to communicate user data via n41 5G NR bands. In another embodiment, the second radio antenna is configured to communicate user data via n25 5G NR bands and/or n66 5G NR bands.

At 308, in response to the triggering temperature being detected at the first radio antenna, the system offloads at least a portion of the user data from the first radio antenna to the second radio antenna. For example, the second radio antenna is configured to offload a portion of user data while another portion of user data continues to be communicating from the first radio antenna. The offload balancing of user data between the first and second radio antennas helps mitigate the temperature-induced signal degradation that would be experienced by subscribers. The system can switch and balance the communication of the user data between the first radio antenna and the second radio antenna via an algorithm. For example, the system can dynamically distribute an offloading of the user data based on an AI/ML algorithm configured to improve the signal quality for a TWTN connection by predicting temperature-inducted degradation.

At 310, in response to determining that the temperature conditions affecting the first radio antenna have returned to the normal temperature, the system reconfigures the communication of the user data to use the first radio antenna more than or instead of the second radio antenna. The system can switch and balance the communication of the user data between the first radio antenna and the second radio antenna via an algorithm. For example, the system can dynamically distribute an offloading of the user data based on an AI/ML algorithm configured to improve the signal quality for a TWTN connection.

Computer System

Figure 4:
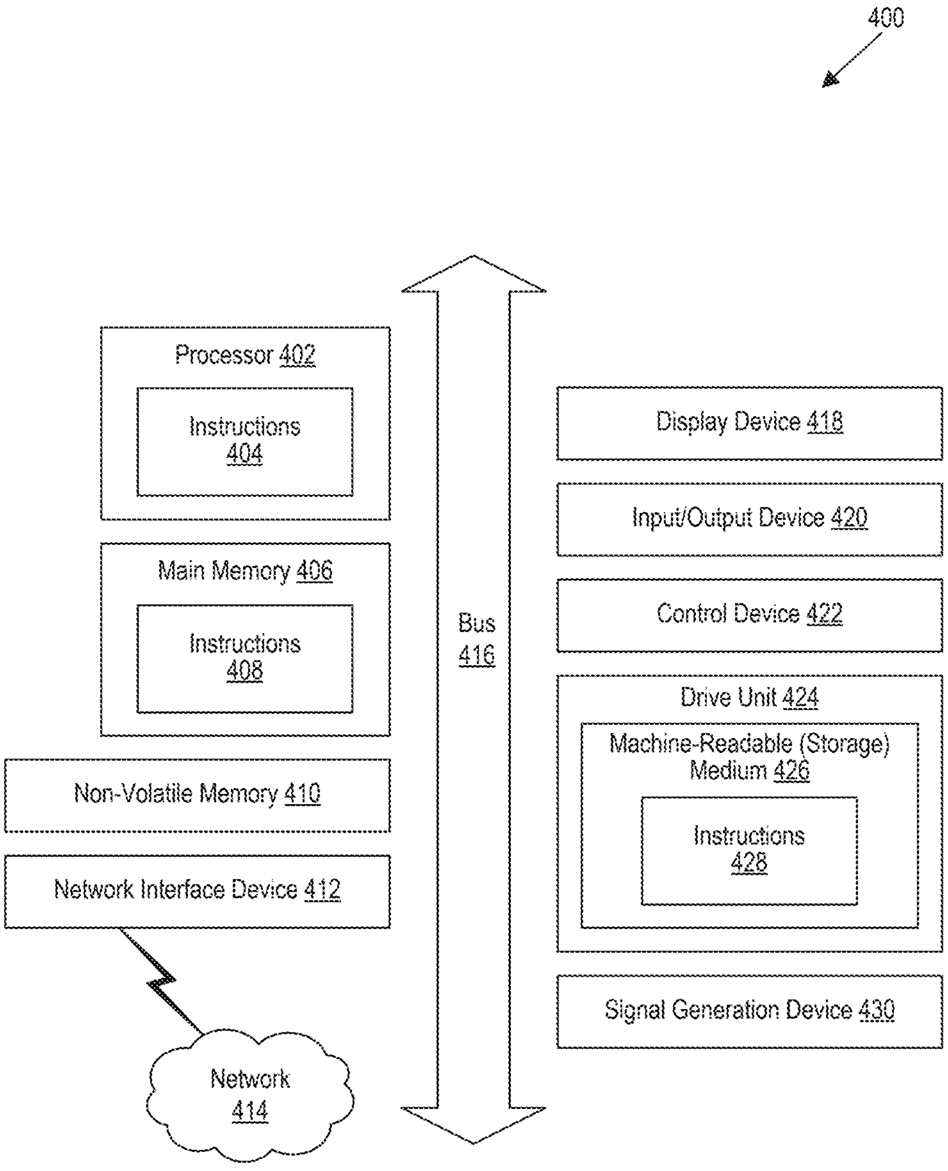
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, a video display device 418, an input/output device 420, a control device 422 (e.g., keyboard and pointing device), a drive unit 424 that includes a machine-readable (storage) medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementations, the computer system 400 can be an embedded computer system, a system-on-chip (SOC), a single-board computer system (SBC), or a distributed system such as a mesh of computer systems, or it can include one or more cloud components in one or more networks. Where appropriate, one or more computer systems 400 can perform operations in real time, in near real time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A non-transitory, computer-readable storage medium comprising instructions recorded thereon, wherein the instructions, when executed by at least one data processor of a system, cause the system to:

monitor a temperature associated with a first radio antenna of a terrestrial wireless telecommunications network, wherein the first radio antenna is configured to communicate user data with a signal quality at a normal temperature;

determine a triggering temperature that causes signal degradation of the first radio antenna, wherein the triggering temperature is equal to or greater than a threshold temperature based on a standard that affects the signal quality of the first radio antenna;

determine a second radio antenna to offload user data from the first radio antenna affected by a temperature condition, wherein the second radio antenna is located at a base station with the first radio antenna, and wherein the second radio antenna is available and with performance unaffected by the temperature condition causing signal degradation of the first radio antenna;

in response to the triggering temperature being detected at the first radio antenna, offload at least a portion of the user data from the first radio antenna to the second radio antenna while another portion of the user data continues to be communicated from the first radio antenna; and in response to determining that the temperature condition affecting the first radio antenna has returned to the normal temperature, reconfigure communication of the user data via the first radio antenna instead of the second radio antenna.

2. The non-transitory, computer-readable storage medium of claim 1, wherein the system is further caused to:

determine the triggering temperature that causes signal degradation based on a standard historical data collected of the first radio antenna.

3. The non-transitory, computer-readable storage medium of claim 1, wherein the system is further caused to:

determine the triggering temperature that causes signal degradation based on a standard specification of data collected of the first radio antenna.

4. The non-transitory, computer-readable storage medium of claim 1, wherein the system is further caused to:

determine that the triggering temperature is caused by environmental conditions at a location of the first radio antenna.

5. The non-transitory, computer-readable storage medium of claim 1, wherein the system is further caused to:

determine that the triggering temperature is caused by electronic components of the first radio antenna.

6. The non-transitory, computer-readable storage medium of claim 1, wherein the system is further caused to:

configure the first radio antenna to communicate user data via n41 Fifth Generation New Radio (5G NR) bands.

7. The non-transitory, computer-readable storage medium of claim 1, wherein the system is further caused to:

configure the second radio antenna to communicate user data via n25 Fifth Generation New Radio (5G NR) bands and/or n66 5G NR bands.

8. The non-transitory, computer-readable storage medium of claim 1, wherein the system is further caused to:

dynamically distribute an offloading of user data based on an artificial intelligence (AI)/machine learning (ML) algorithm configured to improve signal quality for a terrestrial wireless telecommunications network.

9. A system comprising:

at least one hardware processor; and at least one non-transitory memory storing instructions, which, when executed by the at least one hardware processor, cause the system to:

monitor a temperature associated with a first radio antenna of a terrestrial wireless telecommunications network;

determine a triggering temperature that causes signal degradation of the first radio antenna;

determine a second radio antenna to offload user data from the first radio antenna affected by a temperature condition, wherein the second radio antenna is located at a base station with the first radio antenna; and in response to the triggering temperature being detected at the first radio antenna, offload at least a portion of the user data from the first radio antenna to the second radio antenna while another portion of the user data continues to be communicated from the first radio antenna.

10. The system of claim 9, wherein the triggering temperature that causes signal degradation is determined based on a historical temperature data and/or a standard specification of data collected of the first radio antenna.

11. The system of claim 9, wherein the triggering temperature is caused by electronic components and/or environmental conditions at a location of the first radio antenna.

12. The system of claim 9:

wherein the first radio antenna is configured to communicate user data via n41 Fifth Generation New Radio (5G NR) bands, and wherein the second radio antenna is configured to communicate user data via n25 5G NR bands and/or n66 5G NR bands.

13. The system of claim 9, further caused to:

dynamically distribute an offloading of the user data based on an artificial intelligence (AI)/machine learning (ML) algorithm configured to improve signal quality for a terrestrial wireless telecommunications network.

14. A method for managing temperature-induced signal degradation of one or more radio antennas, the method comprising:

monitoring a temperature associated with a first radio antenna of a terrestrial wireless telecommunications network;

determining a triggering temperature that causes signal degradation of the first radio antenna;

determining a second radio antenna to offload user data from the first radio antenna affected by a temperature condition, wherein the second radio antenna is located at a base station with the first radio antenna; and in response to the triggering temperature being detected, offloading at least a portion of the user data from the first radio antenna to the second radio antenna while another portion of the user data continues to be communicated from the first radio antenna.

15. The method of claim 14, further comprising:

in response to determining that the temperature condition affecting the first radio antenna has stopped, reconfiguring communication of the user data to use the first radio antenna instead of the second radio antenna.

16. The method of claim 14, further comprising:

determining the triggering temperature that causes signal degradation of a first radio antenna by collecting data based on a historical index and/or a standard specification of the first radio antenna.

17. The method of claim 14, further comprising:

configuring the first radio antenna to communicate user data via n41 Fifth Generation New Radio (5G NR bands), wherein the second radio antenna is configured to communicate user data via n25 5G NR bands and/or n66 5G NR bands.

* * * * *